(12) United States Patent
Jeon et al.

(10) Patent No.: US 9,972,888 B2
(45) Date of Patent: May 15, 2018

(54) WIRELESS COMMUNICATION DEVICE (71) Applicant: SAMSUNG ELECTRONICS CO., LTD., Suwon-si (KR)

(72) Inventors: Seung-gil Jeon, Suwon-si (KR); Sang-uk Park, Anyang-si (KR); Sang-hoon Park, Seoul (KR); Seung-kee Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 642 days.

(21) Appl. No.: 14/314,495

(22) Filed: Jun. 25, 2014

(65) Prior Publication Data
US 2015/0029060 A1    Jan. 29, 2015

(30) Foreign Application Priority Data

Jul. 29, 2013    (KR) .................. 10-2013-0089467

(51) Int. Cl.
*H01Q 1/24* (2006.01)
*H01Q 1/48* (2006.01)
*H01Q 1/27* (2006.01)
*H04W 88/00* (2009.01)

(52) U.S. Cl.
CPC ............. *H01Q 1/24* (2013.01); *H01Q 1/273* (2013.01); *H01Q 1/48* (2013.01); *H04W 88/00* (2013.01)

(58) Field of Classification Search
CPC ............ H01Q 1/24; H01Q 1/273; H01Q 1/48; H04W 88/00
See application file for complete search history.

(56) References Cited

U.S. PATENT DOCUMENTS

| 8,077,110 | B2 | 12/2011 | Soler Castany et al. |
| 2003/0063040 | A1 | 4/2003 | Miyata et al. |
| 2004/0027298 | A1* | 2/2004 | Iguchi ............... H01Q 1/241 343/702 |
| 2004/0155818 | A1 | 8/2004 | Barras et al. |
| 2006/0187124 | A1* | 8/2006 | Goldberg .............. H01Q 1/38 343/700 MS |
| 2006/0260842 | A1* | 11/2006 | Sim ................. G04G 17/083 174/562 |
| 2007/0120748 | A1 | 5/2007 | Jenwatanavet et al. |

(Continued)

FOREIGN PATENT DOCUMENTS

| KR | 10-2006-0119007 A | 11/2006 |
| WO | 2006051113 A1 | 5/2006 |
| WO | 03/077361 A1 | 9/2006 |

OTHER PUBLICATIONS

Communication dated Nov. 28, 2014 by the European Patent Office in related application 14176031.4.

(Continued)

*Primary Examiner* — Dieu H Duong
*Assistant Examiner* — Bamidele A Jegede
(74) *Attorney, Agent, or Firm* — Sughrue Mion, PLLC (57) ABSTRACT

A wireless communication device having a stable capacity of an antenna even if a terminal is bent or folded is disclosed. The wireless communication device includes an antenna, a first ground portion to which the antenna is grounded, and a second ground portion that is electrically separated from the first ground portion, and the wireless communication device is bent around a boundary between the first ground portion and the second ground portion.

16 Claims, 11 Drawing Sheets

(56) References Cited

U.S. PATENT DOCUMENTS

| | | |
|---|---|---|
| 2007/0229373 A1 | 10/2007 | Mashima et al. |
| 2008/0143616 A1* | 6/2008 | Tu .......................... G06F 1/1616 343/702 |
| 2009/0181732 A1* | 7/2009 | Isoda ..................... H01Q 1/243 455/575.3 |
| 2009/0184878 A1* | 7/2009 | Lai ....................... H01Q 9/0421 343/845 |
| 2012/0038536 A1* | 2/2012 | Soler Castany ....... H01Q 1/242 343/848 |

OTHER PUBLICATIONS

Anping Zhao et al., "The Use of Murata Ceramic Bluetooth Antenna for Wrist Device Based on Flexible Printed Circuit Boards"; Wireless Technology, Oct. 2008; 4 pages total.
Communication dated Aug. 1, 2016, issued by the European Patent Office in counterpart European Application No. 14176031.4.

* cited by examiner

WIRELESS COMMUNICATION DEVICE

CROSS REFERENCE TO RELATED APPLICATION

This application claims priority from Korean Patent Application No. 10-2013-0089467 filed on Jul. 29, 2013, in the Korean Intellectual Property Office, the disclosure of which is incorporated herein by reference in its entirety.

BACKGROUND

1. Field

Devices consistent with exemplary embodiments relate to a wireless communication device, and more particularly, to a wireless communication device having a constant antenna performance even if the device is bent or is folded.

2. Description of the Related Art

Various types of mobile communication terminal devices, such as a flip type, a folder type, and a slide type, have been developed. Recently, a tablet type mobile communication terminal device having a touch screen provided on a front portion thereof has also been developed. Since such a device, also referred to as a tablet phone, includes a display with a full touch screen provided on the front portion thereof, the tablet phone has the advantages that its input and output are more intuitive, and fine designs can be implemented. Further, since the recently developed tablet phone has a minimum housing thickness through SOC designs, portability of the tablet phone can be maximized.

Figure 1A:
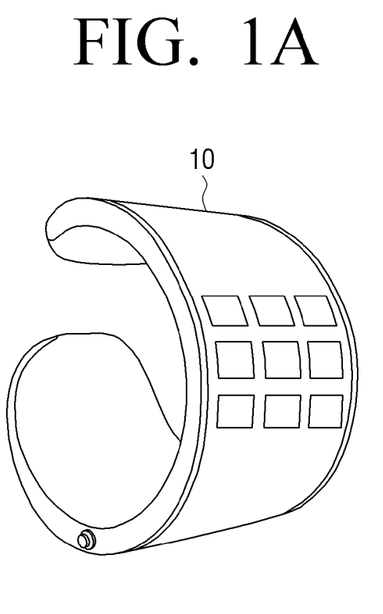
FIG. 1A is a view illustrating a bendable phone in a wearing state.
Figure 1B:
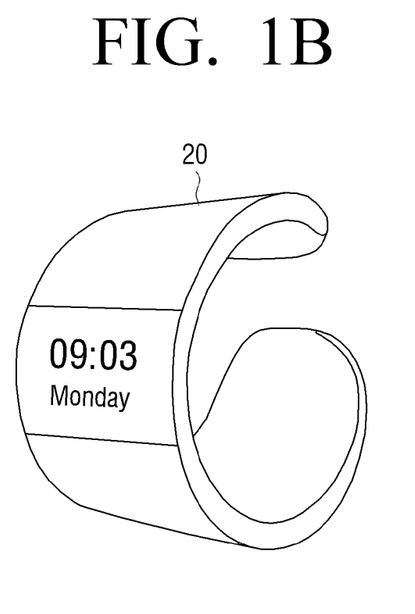
FIG. 1B is a view illustrating a watch phone.

Hereinafter, it is expected that a mobile communication terminal device will evolve into a flexible phone that can be bent or folded. A flexible phone is classified into a watch phone, a foldable phone, and a bendable phone. The watch phone is a phone that can be worn on the wrist of a user in the form of a watch, and commercialization of a smart watch is expected in the course of time. The foldable phone is a phone having a plurality of folded bodies, and can be folded in various shapes depending on the intended use or purpose thereof. The bendable phone is a phone of which the body can be bent, and corresponds to a device generally referred to as a flexible phone. The flexible phone may be configured in two states: a wearing state in which the flexible phone is worn and a shape of the flexible phone is changed and a release state in which the flexible phone is not worn. FIG. 1A illustrates a bendable phone 10 in a wearing state, and FIG. 1B illustrates a watch phone 20.

However, it has been found that the shape change of the flexible phone may exert an influence on the performance of an antenna. That is, it has been found that an additional mode occurs due to coupling in a flexible phone that is bent or folded.

Figure 2:
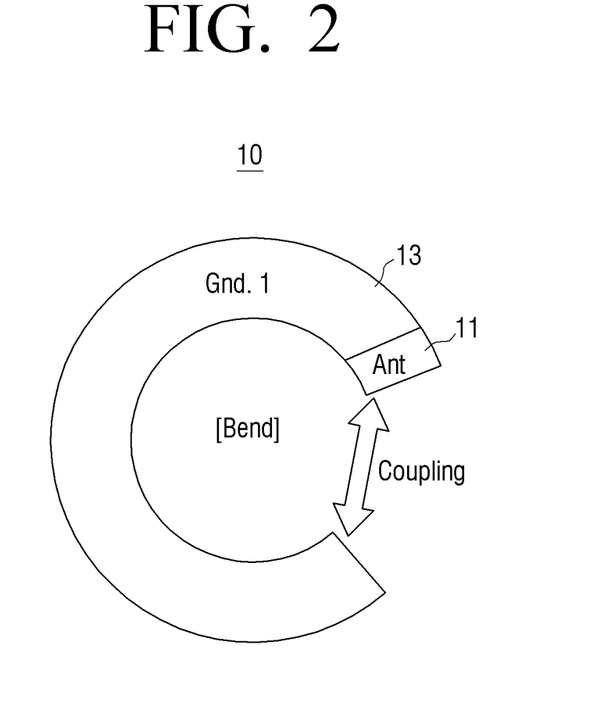
FIG. 2 is a conceptual view illustrating a coupling phenomenon of a flexible phone that is in a bent state.

FIG. 2 is a conceptual view illustrating a coupling phenomenon of a flexible phone that is in a bent state.

The transmission and reception performance of an antenna depends on a combination of an emitter and ground. As shown in FIG. 2, if a flexible phone 10 is bent and if an antenna 11 approaches an opposite ground 13 of the flexible phone 10, additional resonance or impedance change occurs in the antenna transmission and reception signal. That is, signal energy that is emitted from the antenna 11 is excited to a system ground 13 that forms a part of the antenna, and this excited signal energy causes the characteristic change of the antenna. In other words, a kind of feedback loop is formed between the antenna 11 and the ground 13, and this phenomenon is called an additional mode due to the coupling. If the additional mode due to the coupling occurs, the antenna transmission and reception performance is lowered in comparison to the antenna transmission and reception performance in the case where the flexible phone 10 is not bent.

Figure 3:
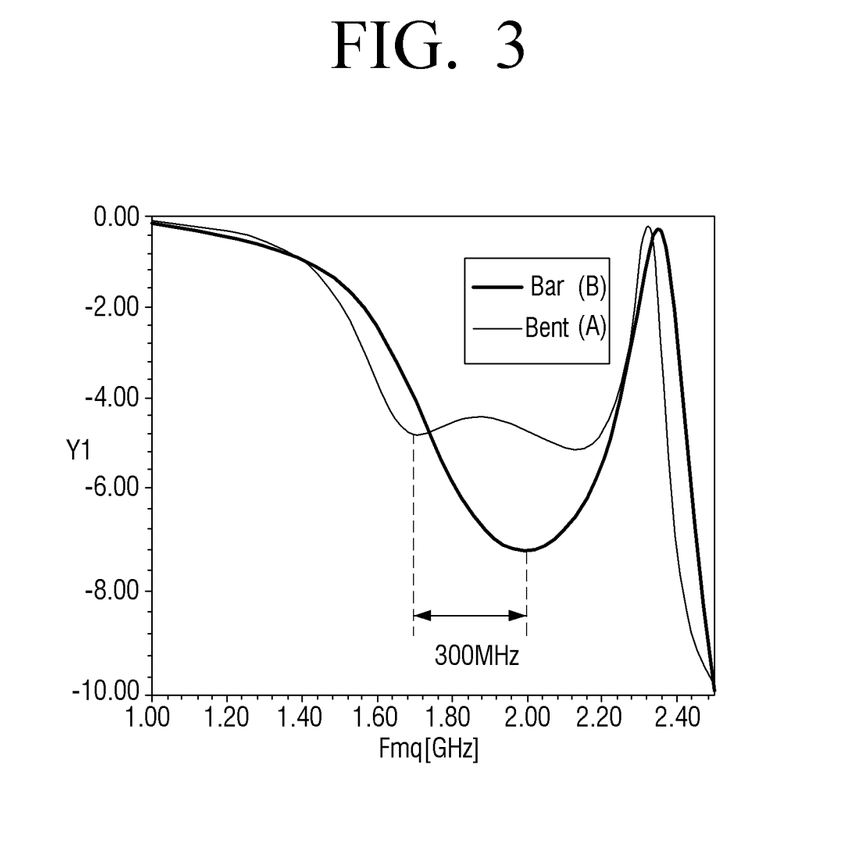
FIG. 3 a graph illustrating the result of measurement of a frequency change in a state where a flexible phone is bent.

FIG. 3 is a graph illustrating the result of a measurement of a frequency change in a state where a flexible phone is bent.

As illustrated in FIG. 3, if the flexible phone is bent ("A" state), it can be seen that the operating frequency is lowered to approximately 1.6 GHz. This lowering of operating frequency indicates that a deviation of about 300 MHz is occurring as compared with the operating frequency in the state where the flexible phone is not bent ("B" state). Further, if the flexible phone is bent, it can be seen that the bandwidth of the operating frequency is greatly reduced. Accordingly, in the case where the flexible phone is bent, the antenna performance becomes deteriorated. If the shape of the flexible phone is changed, the frequency characteristics thereof differ depending on the changed shape, and thus it may be difficult to expect a consistent antenna performance.

Accordingly, there is a need for a technology of a wireless communication device that has a relatively consistent antenna performance even if the shape of the terminal device is changed.

SUMMARY

The exemplary embodiments have been made to address at least the above problems and/or disadvantages and to provide at least the advantages described below. Accordingly, one or more exemplary embodiments provide a wireless communication device having a relatively consistent antenna performance even if the shape of the terminal device is changed.

According to an aspect of an exemplary embodiment, there is provided a wireless communication device including an antenna, a first ground portion to which the antenna is grounded; and a second ground portion that is electrically separated from the first ground portion, wherein the wireless communication device is bent around a boundary between the first ground portion and the second ground portion.

The first ground portion and the second ground portion may each be connected to at least one of a data line and a power line.

The first ground portion and the second ground portion may include independent power modules.

The first ground portion and the second ground portion may be bendable.

The first ground portion and the second ground portion may be accommodated in a single bendable housing.

The wireless communication device may be configured such that when the wireless communication device is not bent, a ground of the first ground portion is connected to a ground of the second ground portion.

The wireless communication device may be configured such that when the wireless communication device is not bent, a ground of the first ground portion is coupled to a ground of the second ground portion by an emission signal of the antenna.

The wireless communication device may be folded around the boundary between the first ground portion and the second ground portion.

The wireless communication device may be twistable.

A ground of the first ground portion and a ground of the second ground portion may each be implemented as a digital ground.

BRIEF DESCRIPTION OF THE DRAWINGS

The above and other aspects, features and advantages will be more apparent from the following detailed description of exemplary embodiment taken in conjunction with the accompanying drawings, in which.

DETAILED DESCRIPTION OF EXEMPLARY EMBODIMENTS

Hereinafter, exemplary embodiments are described in detail with reference to the accompanying drawings.

Figure 4A:
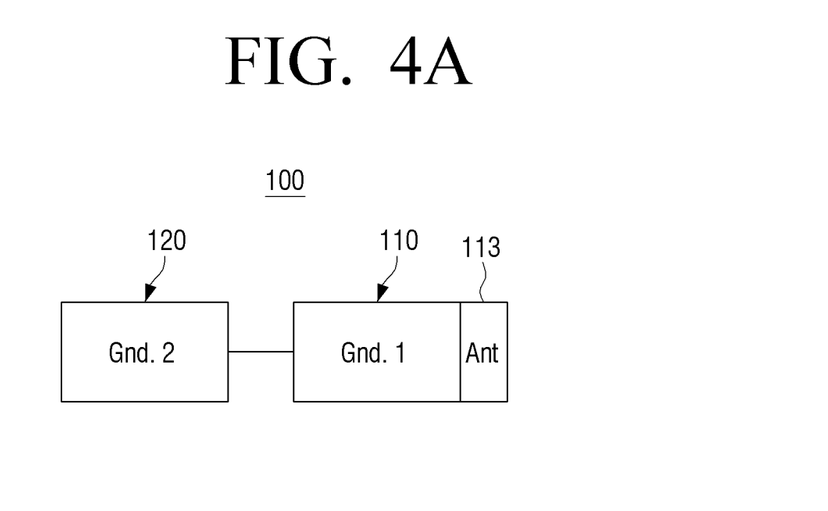
FIGS. 4A and 4B are diagrams illustrating the configuration of a wireless communication device according to an exemplary embodiment.
Figure 4B:
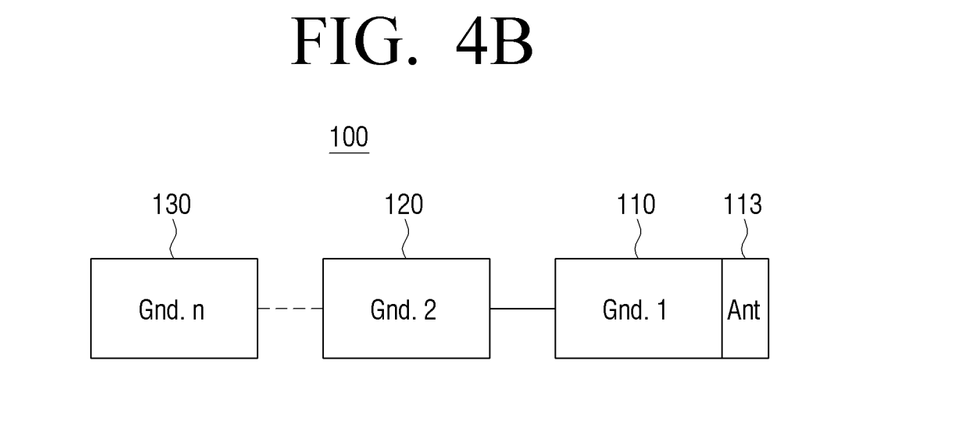

FIGS. 4A and 4B are diagrams illustrating the configuration of a wireless communication device according to an exemplary embodiment.

A wireless communication device according to an exemplary embodiment may be implemented as one of various electronic appliances, which has an antenna that can transmit and/or receive a wireless signal. For example, the wireless communication device can be implemented as one of a smart phone, a tablet PC, a lap-top computer, a watch phone, a digital TV, an MP3 player, and a portable media player (PMP).

As illustrated in FIGS. 4A and 4B, a wireless communication device 100 according to an exemplary embodiment includes a first ground portion 110 and a second ground portion 120.

The first ground portion 110 has a configuration in which an antenna that can transmit and receive electromagnetic waves is grounded. The antenna includes a feeder (not illustrated) and an emitter (not illustrated). The feeder transfers electromagnetic energy to the emitter, and the emitter that has received the electromagnetic energy from the feeder emits electromagnetic waves, which are caused by the electromagnetic energy, to an outside. The feeder may be formed in a vertical or horizontal direction with respect to an emission direction of the electromagnetic waves.

The emitter generates a resonance frequency. Resonance is a phenomenon in which an emitter transmits and receives electromagnetic waves of a specific wavelength most effectively, and a frequency that generates resonance is called a resonance frequency. If the wavelength of the resonance frequency is $\lambda$, the length of the emitter may be set to $n/(4\lambda)$ (where n is a natural number).

The first ground portion 110 includes a substrate (not illustrated) and a housing (not illustrated).

The substrate supports the feeder and the emitter as described above. The substrate may be a PCB (Printed Circuit Board), and a pattern may be formed on an upper surface or a bottom surface of the substrate. An antenna-grounded portion of the substrate forms an analog ground, and the substrate includes a digital ground that is separated from the analog ground.

Further, the housing that is made of a conductor is connected to the substrate, and thus serves as a digital ground. In this case, the housing of the first ground portion 110 and the housing of the second ground portion 120 are separated from each other. However, if the housing is not made of a conductor, the housing of the first ground portion 110 and the housing of the second ground portion 120 may be integrally formed.

The second ground portion 120 has a similar configuration to the first ground portion 110. That is, the second ground portion 120 includes a substrate (not illustrated) and a housing (not illustrated).

In the same manner, the substrate may be a Printed Circuit Board (PCB), and a pattern may be formed on the upper surface or the bottom surface of the substrate. Further, the housing may be made of a conductor, and may be separated from the housing of the first ground portion 110. However, if the housing is made of a non-conductor, the housing of the first ground portion 110 and the housing of the second ground portion 120 may be integrally formed.

In particular, according to the exemplary embodiments, the first ground portion 110 and the second ground portion 120 are electrically separated from each other. The substrates and the housings of the first ground portion 110 and the second ground portion 120 are electrically separated from each other. Accordingly, current that flows through the first ground portion 110 is unable to flow to the second ground portion 120.

Further, the wireless communication device 100 according to the exemplary embodiments is bendable around a boundary between the first ground portion 110 and the second ground portion 120. That is, if an external force acts on the wireless communication device 100, the wireless communication device 100 may be bent around the boundary between the first ground portion 110 and the second ground portion 120.

The wireless communication device 100 may include various configurations for processing, outputting, and storing data. That is, the wireless communication device 100 may include a Micro Processing Unit (MPU) or a Central Processing Unit (CPU) having control and operation capabilities, a data bus, a cache memory, a random access memory (RAM), a Graphics Processing Unit (GPU) for graphic processing, and a frame buffer. Further, the wireless communication device 100 may include various near field communication modules and wired interface modules such as Mobile High-Definition Link (MHL). Further, the RAM stores an operating system that can perform the operation of the wireless communication device 100, frameworks, and applications. The operating system reads a control command for respective constituent elements to perform the operation of the wireless communication device 100 from the memory according to a system clock, and generates an electric signal according to the control command to operate the respective hardware constituent elements. Further, the wireless communication device 100 includes a touch screen, a display panel, and a display driving circuit.

The respective configurations of the wireless communication device 100 as described above may be positioned in the first ground portion 110 and the second ground portion 120 in a divided fashion. Accordingly, even if the first ground portion 110 and the second ground portion 120 are electrically separated from each other, data lines may be connected to each other to make the data transmission and reception possible. The first ground portion 110 and the second ground portion 120 may be configured to have separate power supplies or to use one power supply together. This exemplary configuration will be described later.

As described above, the first ground portion 110 where the antenna 113 is grounded is electrically separated from the second ground portion 120 that is a remaining portion of the wireless communication device 100, and thus, ground current does not approach the antenna 113 even if the wireless communication device 100 is bent. Accordingly, in the case where the wireless communication device 100 is bent, the performance deterioration problem of the antenna 113, which may occur due to the occurrence of the additional mode that is caused by the coupling, can be solved.

The wireless communication device 100 according to an exemplary embodiment may include two separate digital grounds, including the first ground portion 110 and the second ground portion 120, as illustrated in FIG. 4A, or alternatively may include three or more grounds as illustrated in FIG. 4B. That is, the wireless communication device 100 may include the first to n-th ground portions 110 to 130. As the number of ground divisions becomes larger, the reaching position of the ground current becomes farther from the antenna even if the wireless communication device 100 is bent, and thus the additional mode effect due to the coupling becomes further reduced. That is, a more consistent antenna performance can be expected as the number of ground divisions becomes larger.

Further, if the number of divisions is large, the wireless communication device 100 may more easily facilitate the use of a rigid substrate or battery. An exemplary embodiment in which a rigid configuration is used will be described later.

As described above, according to the wireless communication device 100 according to an exemplary embodiment, the first ground portion 110 and the second ground portion 120 may use one power supply. That is, the power that is included in the first ground portion 110 may be supplied to the second ground portion 120, or the power that is included in the second ground portion 120 may be supplied to the first ground portion 110. However, the power of the first ground portion 110 is used to supply the power to the antenna 113, and thus, if this power is also provided to the second ground portion 120, the cutoff effect with respect to the ground current of the first ground portion 110 may deteriorate. Accordingly, schemes for separately configuring the power supplies to the first ground portion 110 and the second ground portion 120 may be considered, according to exemplary embodiments.

Figure 5:
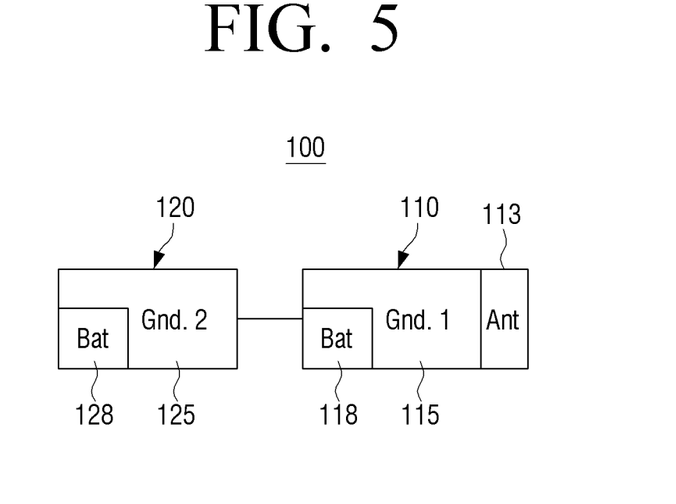
FIG. 5 is a diagram illustrating the configuration of a wireless communication device having grounds with separate power supplies.

FIG. 5 is a diagram illustrating the configuration of a wireless communication device 100 having grounds with separate power supplies.

As illustrated in FIG. 5, the first ground portion 110 and the second ground portion 120 may include independent power modules. The power module may be implemented as one of various kinds of batteries, such as a lithium ion battery and a lithium ion polymer battery. In FIG. 5, the first ground portion 110 may include a first power module 118, and the second ground portion 120 may include a second power module 128. According to this structure, the first ground portion 110 and the second ground portion 120 are connected through a data transmission line only, and thus, this structure is more effective in cutting off the ground current.

Further, it is possible to design the wireless communication device 100 so that only a part of constituent elements is bendable, or alternatively, it is possible to design the wireless communication device 100 so that most constituent elements are bendable.

Figure 6:
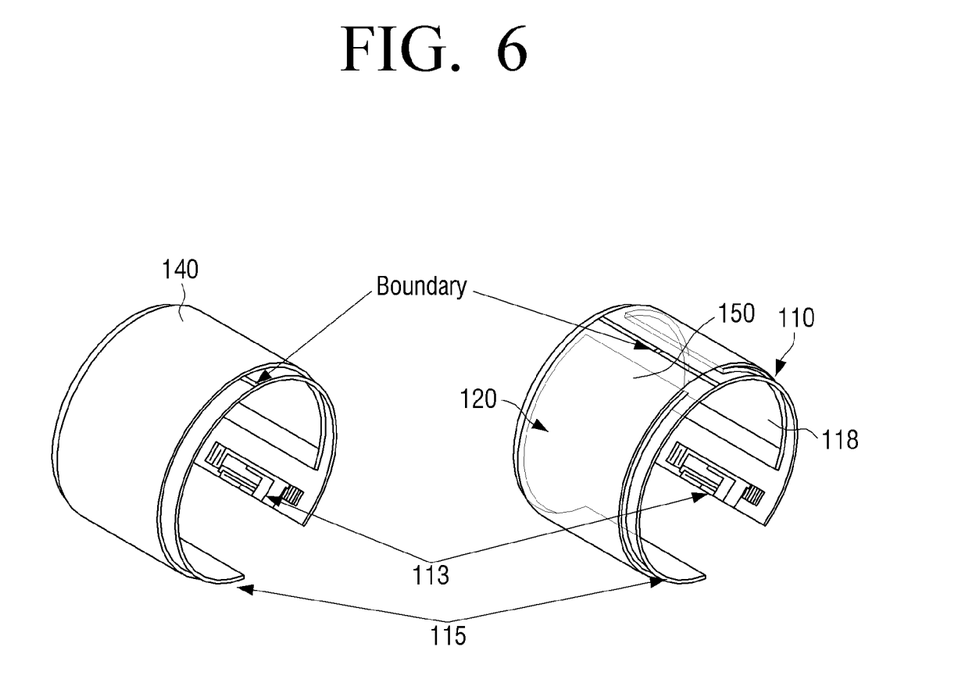
FIG. 6 is a view illustrating a wireless communication device having flexible grounds.

FIG. 6 is a view illustrating a wireless communication device having flexible grounds.

The wireless communication device 100 according to an exemplary embodiment as illustrated in FIG. 6 includes a flexible display 140, a first flexible ground portion 110, and a second flexible ground portion 120.

In this case, the first ground portion 110 and the second ground portion 120 include flexible substrates 150, such as a flexible printed circuit board (F-PCB). The substrate 150 is accommodated in a flexible housing 115 that is made of plastic or another flexible material. The power module 118 may also be designed to be flexible as illustrated in FIG. 6. However, even if parts of the constituent elements are designed to be rigid, the parts may be accommodated with sufficient space, and thus an external impact may not be applied thereto in the case where the housing is modified.

In the same manner as the above-described exemplary embodiment, the first ground portion 110 and the second ground portion 120 are electrically separated around the boundary portion between the first ground portion 110 and the second ground portion 120, and thus, even if one end of the wireless communication device 100 approaches the antenna 113 that corresponds to the other end thereof, the additional mode phenomenon can be minimized.

Figure 7:
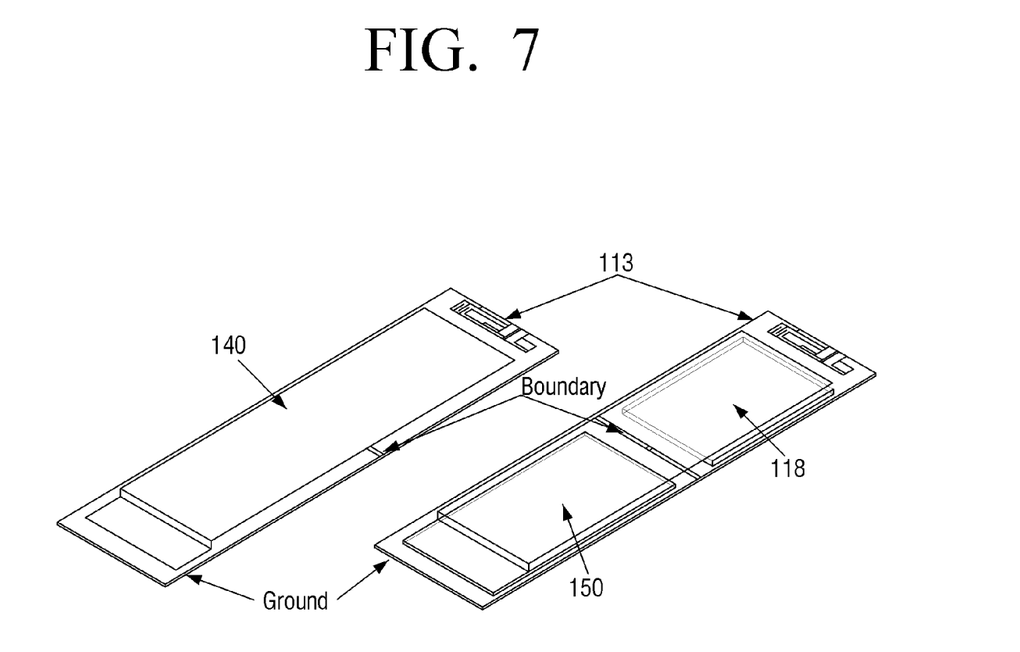
FIG. 7 is a view illustrating a state where the wireless communication device of FIG. 6 is not bent.

FIG. 7 is a view illustrating a state where the wireless communication device of FIG. 6 is not bent.

However, unlike the configuration shown in FIG. 7, it is also possible to design the wireless communication device so that only a part of the constituent elements is bendable.

Figure 8:
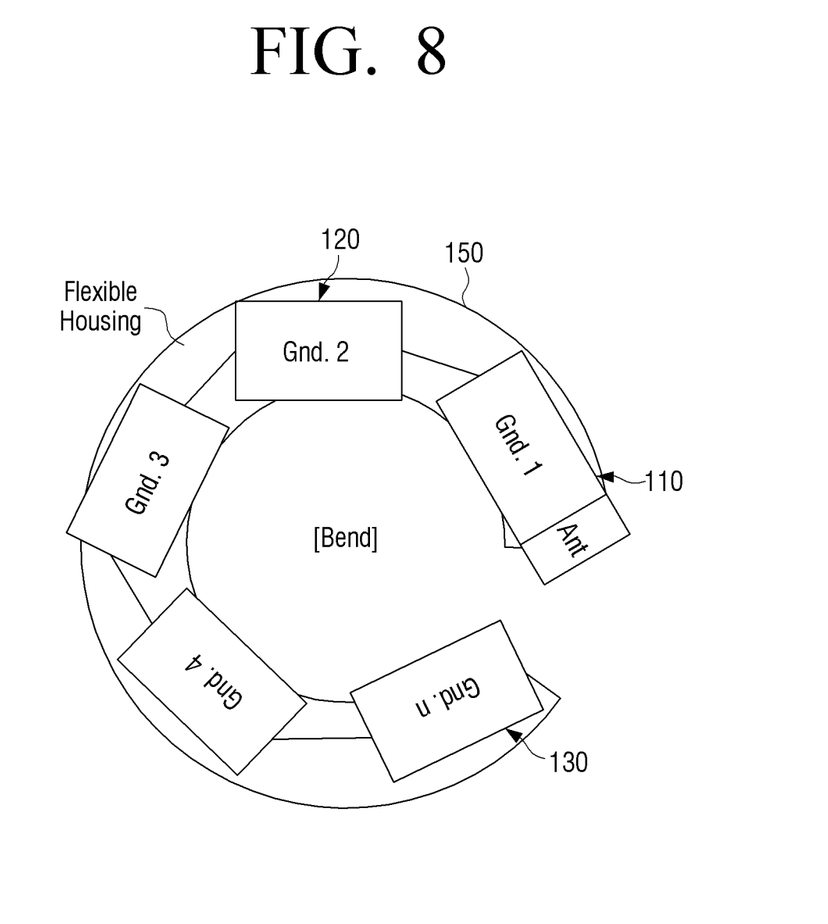
FIGS. 8 and 9 are views of a wireless communication device having rigid ground portions.
Figure 9:
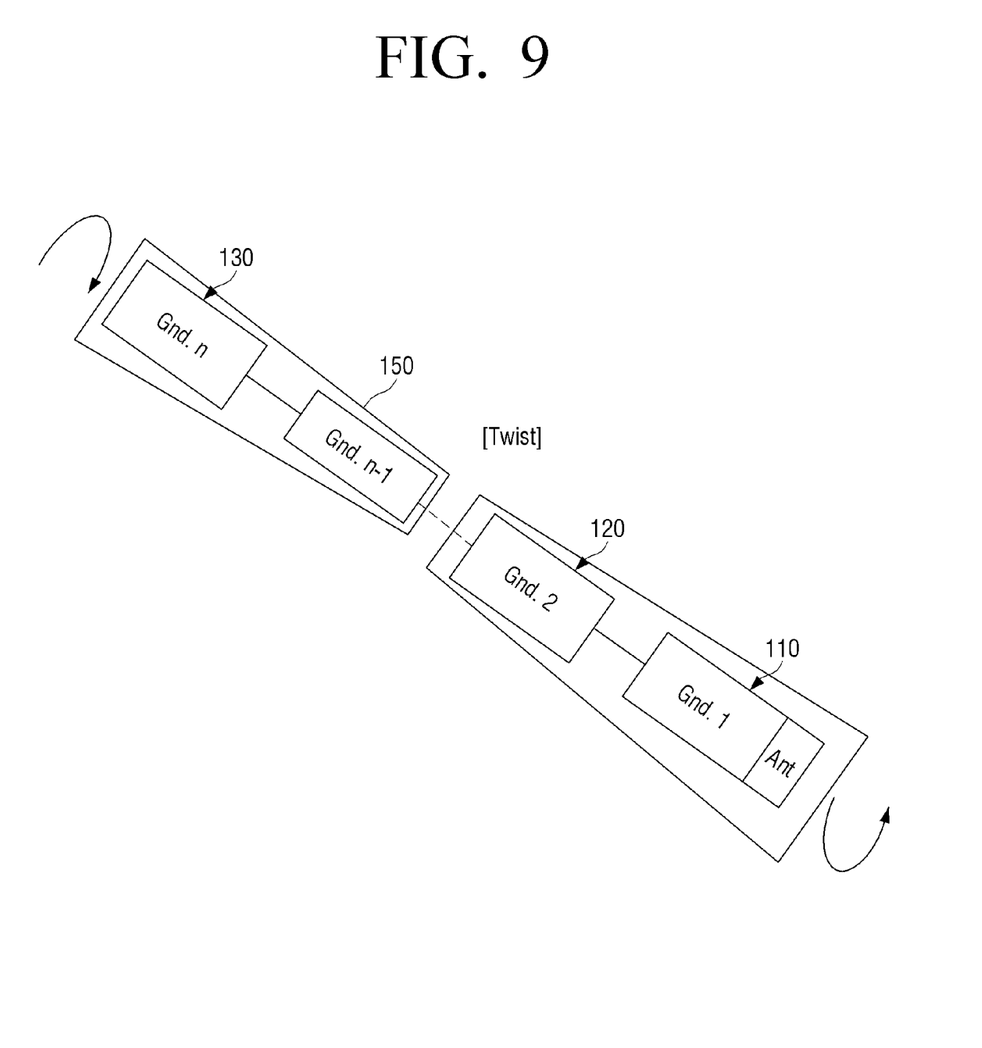

FIGS. 8 and 9 are views of a wireless communication device having rigid ground portions.

As illustrated in FIGS. 8 and 9, the first to n-th ground portions 120 to 130 may be rigid. However, even in this case, the housing 150 that accommodates the respective ground portions may be flexible. The housing 150 has a sufficient space therein, and thus is designed so that an impact is not applied to the ground portions therein even if the wireless communication device 100 is bent. Such a design has the advantage that the increase of the manufacturing cost of the product is suppressed and a stable performance is secured.

FIG. 9 illustrates an example of a wireless communication device that is twisted clockwise or counterclockwise. That is, a lower section that includes the first ground portion 110 and the second ground portion 120 and an upper section that includes the n-th ground portion 130 may be twisted in opposite directions. Even in this case, the housing 150 is designed to be twistable and to have sufficient space therein, and thus an impact is not applied to the ground portions therein even if the wireless communication device 100 is twisted.

In contrast, if the wireless communication device 100 is not bent, the additional mode due to the coupling does not occur even if the ground current flows up to the end portion of the wireless communication device 100. It is known that the communication performance improves as the ground becomes wider. Accordingly, if a user of the bendable wireless communication device 100 does not prefer to bend the bendable wireless communication device 100, it may be acceptable for the ground current flow to an adjacent ground portion.

Figure 10A:
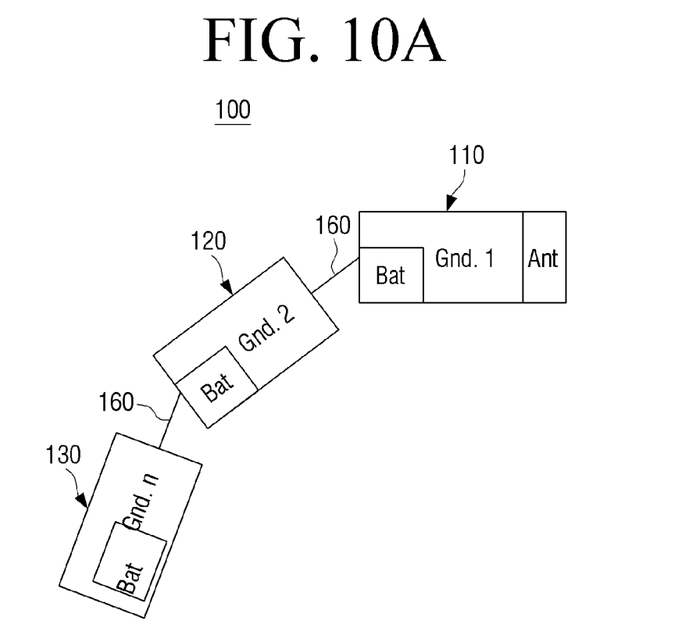
FIGS. 10A and 10B are views illustrating a wireless communication device in which grounds are connected to each other in a state where the wireless communication device is not bent.
Figure 10B:
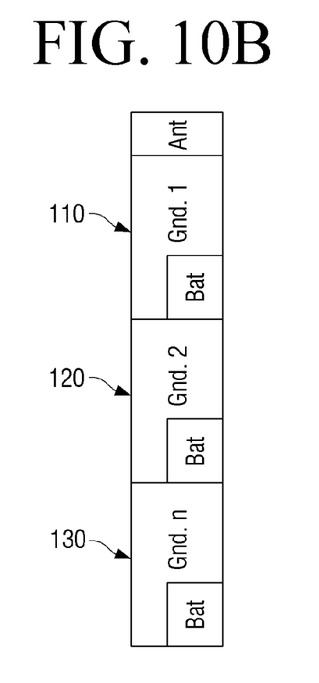

FIGS. 10A and 10B illustrate such exemplary embodiments. FIGS. 10A and 10B are views illustrating a wireless communication device in which grounds are connected to each other in a state where the wireless communication device is not bent.

FIG. 10A illustrates a case where the wireless communication device 100 is bent or folded. In this case, in the same manner as the above-described exemplary embodiment, the antenna ground current of the first ground portion 110 does not reach the second ground portion 120. Accordingly, the antenna performance is not deteriorated due to the additional mode caused by the coupling.

However, if the wireless communication device 100 is not bent as shown in FIG. 10B, the grounds of the first ground portion 110 and the second ground portion 120 are electrically connected to each other. In this case, the substrates or the housings come in mutual contact with each other, and the ground current of the first ground portion 110 is transferred to the second ground portion 120 and the n-th ground portion 130. If the ground is widened as described above, the antenna performance becomes further improved.

According to this exemplary embodiment, the antenna performance of the wireless communication device 100 becomes further improved.

In the exemplary embodiments as described above, it is exemplified that the wireless communication device 100 is configured to be bent, but the exemplary embodiments are not limited thereto. That is, even in the case where the wireless communication device is folded or twisted, the above-described exemplary embodiments can be applied thereto in the same manner.

Figure 11:
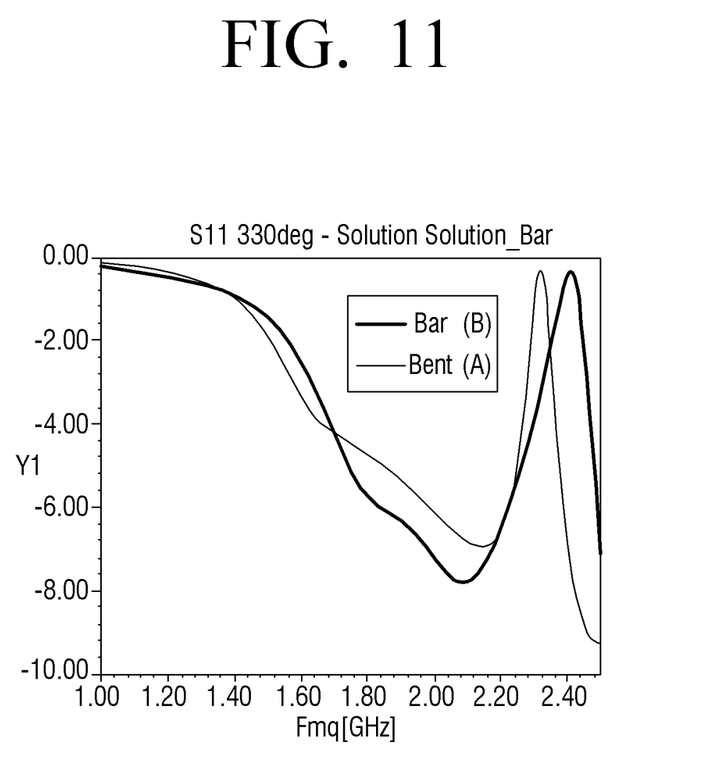
FIG. 11 is an experimental graph illustrating the result of measurement of a frequency change in a state where a wireless communication device according to an exemplary embodiment is bent.

FIG. 11 is an experimental graph illustrating the result of measurement of a frequency change in a state where a wireless communication device according to an exemplary embodiment is bent.

As illustrated in FIG. 11, even in the case where the wireless communication device 100 is bent ("A" state), it can be seen that the operating frequency is maintained at approximately 2.1 GHz. This value is almost the same as the value in the case where the wireless communication device 100 is not bent ("B" state). Further, even in the case where the wireless communication device 100 is bent, it can be seen that there is almost no change in the bandwidth of the operating frequency ("A" state).

As described above, according to the various exemplary embodiments, a wireless communication device 100 having a relatively consistent antenna performance can be provided even if the shape of the terminal device is changed.

While exemplary embodiments have been shown and described, it will be understood by those skilled in the art that various changes in form and detail may be made therein without departing from the spirit and scope of the inventive concept, as defined by the appended claims.

What is claimed is:

1. A wireless communication device comprising:
   an antenna;
   a first ground portion comprising a first ground to which the antenna is grounded; and
   a second ground portion comprising a second ground, wherein the wireless communication device is configured to bend around a boundary between the first ground portion and the second ground portion in a bent configuration,
   the first ground and the second ground are electrically separated when the wireless communication device is in the bent configuration,
   the first ground and the second ground are electrically connected when the wireless communication device is in an unbent configuration, and
   each of the first ground portion and the second ground portion comprises an independent power module.

2. The wireless communication device as claimed in claim 1, wherein the first ground portion and the second ground portion are each connected to at least one of a data line and a power line in both the bent configuration and the unbent configuration.

3. The wireless communication device as claimed in claim 1, wherein the first ground portion and the second ground portion are bendable.

4. The wireless communication device as claimed in claim 1, further comprising a bendable housing,
   wherein the first ground portion and the second ground portion are accommodated in the bendable housing.

5. The wireless communication device as claimed in claim 1, wherein the wireless communication device is configured such that when the wireless communication device is in the unbent configuration, and
   a ground current is transferred to the second ground portion via the first ground portion.

6. The wireless communication device as claimed in claim 1, wherein the wireless communication device is twistable.

7. The wireless communication device as claimed in claim 1, wherein the first ground and the second ground each are implemented as a digital ground.

8. A wireless communication device comprising:
   a flexible housing formed of a first material;
   a plurality of ground portions each respectively formed of a second material, the plurality of ground portions being embedded within the flexible housing and each comprising a corresponding ground connection formed on a flexible substrate; and
   an antenna connected to one of the ground connections,
   wherein the second material has a greater rigidity than the first material,
   the wireless communication device is configured to bend around a boundary in a bent configuration,
   the ground connections of each of the plurality of ground portions are electrically separated when the wireless communication device is in the bent configuration,
   the ground connections of each of the plurality of ground portions are electrically connected when the wireless communication device is in an unbent configuration, and
   each of the plurality of ground portions comprises a corresponding power module.

9. The wireless communication device as claimed in claim 8, wherein the plurality of ground portions are connected to at least one among a data line and a power line in a chain configuration inside of the flexible housing.

10. The wireless communication device as claimed in claim 9, wherein the plurality of ground portions are connected together via the data line.

11. The wireless communication device as claimed in claim 8, wherein the first material comprises plastic.

12. The wireless communication device as claimed in claim 11, wherein the antenna is connected to a ground portion at one end of a chain configuration.

13. The wireless communication device as claimed in claim 12, wherein the plurality of ground portions comprises at least three ground portions.

14. A wireless communication device comprising:
a first ground portion comprising a first ground;
a second ground portion comprising a second ground; and
a bendable housing which houses the first and second ground portions,
wherein the first and second grounds are configured such that current flowing through the first ground cannot flow to the second ground when the wireless communication device is in a bent configuration,
the first and second grounds are configured such that current flowing through the first ground can flow to the second ground when the wireless communication device is in an unbent configuration, and
each of the first ground portion and the second ground portion comprises an independent power module.

15. The wireless communication device as claimed in claim 14, wherein the first and second ground portions are electrically isolated from each other by an air gap therebetween when the wireless communication device is in the bent configuration.

16. The wireless communication device as claimed in claim 14, wherein the wireless communication device is implemented as one of a smart phone, a tablet personal computer, a lap-top computer, a watch phone, a digital television, an MP3 player, and a portable media player.

* * * * *